Patented June 16, 1931

1,809,990

UNITED STATES PATENT OFFICE

GILBERT EDWARD SEIL, OF CONSHOHOCKEN, PENNSYLVANIA, ASSIGNOR TO E. J. LAVINO AND COMPANY, OF PHILADELPHIA, PENNSYLVANIA, A CORPORATION OF DELAWARE

METHOD OF MAKING MATERIAL FOR THE PURIFICATION OF GASEOUS MIXTURES

No Drawing.    Application filed June 11, 1928.    Serial No. 284,671.

My invention relates to methods of making material for the purification of gaseous mixtures and has particular relation to methods of producing material for removing hydrogen sulphide from gaseous mixtures to purify the said mixtures.

In the manufacture and production of gaseous mixtures large quantities of material containing iron oxide are used and consumed in removing the hydrogen sulphide which may be present from the said mixtures to purify the same. It therefore is desirable to produce such materials at a minimum of cost in order to satisfy the great demand therefor in the gas industry. It not only is desirable that such material be made available at a reasonable price but also that the quality thereof should be such as to satisfy the requirements with respect to its physical and chemical properties.

It therefore is the general object of my invention to provide a novel method of producing material for the purification of gaseous mixtures, which method is simple, efficient and highly economical.

Another object of my invention is to provide a method of novel character for producing a material for the purpose indicated from an industrial by-product or waste.

It also is an object of the present invention to provide a novel method for the treatment of a by-product to effect chemical comminution thereof and to purify the said material whereby a product having the desired chemical and physical qualities is obtained.

A further object of my invention is to provide a novel method for producing a material for purifying gaseous mixtures from a by-product consisting principally of iron oxide or hydroxide, which by-product is or may be obtained from the reduction of inorganic or organic chemical compounds or bodies by means of the action of a deficiency of acid on metallic iron.

Another object of my invention is to provide a novel method of treating a by-product or waste containing iron oxide or hydroxide to remove certain impurities therefrom and to transform the ferrous oxide or hydroxide present therein into finely comminuted particles of ferric oxide, thereby enhancing the chemical activity of the said iron oxide or hydroxide and consequently increasing its efficiency as a gas purification material.

Other objects and advantages of the invention will be pointed out in the following description or will be apparent from such description.

I shall now describe the method or methods preferred by me for producing gas purification material from an industrial by-product or waste, but it should be understood that various changes in the procedure outlined herein may be made without departing from the invention as defined in the claims; and although the proportion or proportions of various compounds, elements, or substances which are present in the materials treated according to my novel method are definitely given in certain instances, it is to be understood that such proportions are stated by way of example only and that my invention is not limited thereto except as expressly is defined by the said claims.

In the art of industrial chemistry it frequently is necessary to reduce inorganic or organic compounds or substances, and one method commonly employed for this purpose consists in generating hydrogen by the action of a deficiency of acid on metallic iron. A deficiency of acid must be employed in effecting this reduction in order that the rate of the generation of the hydrogen by the action of the acid on the said iron will correspond more or less exactly with the rate at which the hydrogen combines with the said compound or substance to bring about the reduction of the latter. It therefore follows that by reason of this deficiency a by-product consisting principally of iron oxide or hydroxide will be formed. Generally this material is a black pasty mixture and besides containing iron oxide or hydroxide in the ferrous state, it also may contain small amounts of graphite, silica, phosphorus, and the like. For example, a typical sample of this material may be analyzed as follows, that is to say,—

|  | Per cent |
|---|---|
| Iron oxide | 78.65–88.66 |
| Moisture | 12.00–16.00 |
| Silica | 3.00– 4.00 |
| Carbon | 1.50– 2.00 |
| Aluminum | 0.15– 0.18 |
| Manganese | 0.15– 0.20 |
| Phosphorus | 0.17– 0.35 |
| Sulphur | 0.23– 0.30 |
| Copper | trace– 0.02 |

As will be obvious, the above product is not suitable for use as material for the purification of gaseous mixtures, and in order to convert the same into a form which will enable it to be disposed of economically and profitably I first mix the said by-product with a suitable amount of alkali or alkaline material of any desired character or concentration and intimately mix the same together. I prefer to employ for this purpose a by-product known in the art as "fished salt", which consists principally of potassium and sodium carbonates and which may not only be obtained economically but has the desired property of alkalinity. This alkali or alkaline material is added in order to increase the efficiency of the gas purification material with respect to its reaction with hydrogen sulphide. In other words, ferric oxide has greater capacity for sulphur in the presence of an alkali or alkaline material. Consequently the amount of said alkaline material which is added generally is regulated according to the requirements.

After the by-product has been completely and intimately mixed with the said alkaline material the mixture is heated or calcined in the presence of air by passing the same through a suitable kiln or muffle in which the temperature should not be less than 200° C. nor more than 400° C. The highest of these temperatures is less than that necessary to effect fusion of the mixture of the by-product and alkaline material or of the by-product alone. Although any kiln or muffle of well known construction may be used in carrying out this heating or calcining treatment, it is desirable if not necessary that the apparatus be so constructed and arranged that contact of the hot flames or gases generated in the said kiln or muffle with the material or mixture of materials being treated should be prevented to avoid contaminating the same. An ordinary cement kiln of the rotary type may be employed but I prefer to pass the material or mixture through a kiln provided with a pair of relatively long conduits or pipes of fairly large diameter, one of which is mounted inside of and concentrically with respect to the other of said pipes. In such an apparatus the inner pipe or conduit will be adapted to conduct hot flames and gases through the interior of the outer pipe through which the material or mixture to be treated is passed. This outer pipe may be and preferably is rotated in order to conduct the mixture of materials therethrough in the same manner as a rotary cement kiln, and a current of air should be circulated therethrough in intimate contact with the heated material to oxidize the same. The period of time during which the mixture of materials is heated will be varied with regard to the character of the by-product, as will be readily understood. However, the desired results will be obtained ordinarily by heating the materials in the above apparatus for about one hour.

During this heating treatment the moisture and other volatile constituents contained in the by-product will be liberated and driven from the mixture and the carbonaceous materials which may be present will be decomposed by the heat to produce carbon and will pass off from the material and out of the system in the form of the gas, carbon dioxide. The iron oxide or hydroxide which may be and usually is present in the crude by-product in the ferrous state also will be oxidized to form ferric oxide, which is the ultimate product which I desire to obtain. As stated already, the crude or untreated by-product is a black pasty mass, whereas the new product obtained by the above procedure is of reddish brown color, consisting of finely comminuted particles of ferric oxide.

Experience has shown that by quenching the material in any well known manner as it is delivered from the kiln or muffle in which it is heated or calcined, its activity and hence its efficiency is increased. The activity and consequently the efficiency of the final product also may be increased by spraying the calcined material with water as it comes from the kiln or muffle, and also may be increased by the action of steam thereon. But I do not regard any one of these steps or treatments as essential to my invention inasmuch as a highly active and efficient product may be and is obtained without their use.

It also should be remarked that it is not essential that alkali or alkaline material be added to the by-product before the heating or calcining of the same. The said alkali or alkaline material may be added at any time after the material has been subjected to the heating treatment. But I find it more convenient to add the said alkali or alkaline material before heating or calcining the said by-product because when so added the material is ready for sale or use as soon as it has been subjected to the heating treatment or after it has been quenched, as the case may be.

It now will be apparent that I have provided a novel and efficient method of producing or preparing material for the purification of gaseous mixtures to remove therefrom the hydrogen sulphide which may be present therein. The simplicity of my novel method is such as to recommend its employment in the manufacture of large quantities of such material. And yet the product obtained by carrying out the procedure of my invention possesses such chemical and physical properties as to fulfill the most exacting requirements which material of this character must satisfy in the trade.

Because of the finely comminuted condition or state of the said product and the high percentage of ferric oxide contained therein, and for other reasons, the said material exhibits a high capacity or affinity for hydrogen sulphide when subjected to "fouling" by gaseous mixtures containing the same. As is well known, the ferric oxide which is present in gas purification material reacts with the hydrogen sulphide gas to form ferric sulphide and water. The material which I produce is especially well adapted for effecting this reaction.

On the other hand, the product obtained according to the procedure of my invention possesses such qualities and properties as to enable it to be easily and quickly revivified by permitting air to contact intimately therewith by any of the methods well known in the art. That is to say, the ferric sulphide which has been formed in the said material may be quickly oxidized to form ferric oxide and to produce elemental sulphur by exposing the said material to the air, whereupon the said material may be employed again for purifying gaseous mixtures. These steps of permitting the "fouling" of the gas purification material and thereafter revivifying the said material as described above may be repeated from time to time, thereby lengthening the life of the said material and consequently greatly reducing the cost thereof; but it will be understood that the said steps or treatments form no part of my invention but serve to illustrate and emphasize the value of the product which I obtain in carrying out my novel method.

Having thus described my invention, what I claim and desire to secure by Letters Patent is:

1. The method of preparing a composition of matter which comprises calcining a by-product resulting from the reduction of a chemical compound by the reaction of a deficiency of acid on metallic iron and quenching the calcined material in water.

2. The method of preparing a material for the purification of gaseous mixtures which comprises mixing a by-product formed upon the reduction of a chemical compound or substance by the action of a deficiency of acid on metallic iron with alkaline material, thereafter calcining the mixture to effect the removable of volatile constituents therefrom, and quenching the calcined material in water.

3. The method of preparing from an iron bearing substance a material which is adapted for use in the purification of gas, which comprises the step of heating the said iron bearing substance in the presence of alkali at a temperature less than is necessary to effect fusion of said iron bearing substance and subsequently quenching the heated material in water.

4. The method of preparing from an iron bearing substance a material which is adapted for use in the purification of gas, which comprises the step of heating the said iron bearing substance in the presence of alkali to a temperature which may range from 200° C. to 400° C. and subsequently quenching the heated material in water.

5. The method of preparing from an iron bearing substance a material which is adapted for use in the purification of gas, which comprises the heating of said iron bearing substance in the presence of an alkali and in the presence of air at a temperature less than is necessary to effect fusion of said iron bearing substance and subsequently quenching the heated material in water.

In testimony that I claim the foregoing as my invention I have hereunto signed my name this 8th day of June, 1928.

GILBERT EDWARD SEIL.